United States Patent [19]

Waring et al.

[11] Patent Number: 4,592,230

[45] Date of Patent: Jun. 3, 1986

[54] APPARATUS FOR AND METHOD OF DETERMINING THE LIQUID COOLANT LEVEL IN A NUCLEAR REACTOR

[75] Inventors: James P. Waring, Rockville; Robert D. Smith, Bethesda, both of Md.

[73] Assignee: Scandpower, Inc., Bethesda, Md.

[21] Appl. No.: 514,600

[22] Filed: Jul. 18, 1983

[51] Int. Cl.⁴ .............................................. G01F 23/00
[52] U.S. Cl. .................................... 73/295; 73/290 R
[58] Field of Search ............. 73/285, 290 R; 374/141; 219/544

[56] References Cited

U.S. PATENT DOCUMENTS

| | | | |
|---|---|---|---|
| 2,702,476 | 2/1955 | Boisblanc | 73/295 |
| 3,280,627 | 10/1966 | Cousins et al. | 73/295 |
| 3,898,431 | 8/1975 | House et al. | 219/544 |
| 3,964,311 | 6/1976 | Holmen | 73/295 |
| 4,440,717 | 4/1984 | Bevilacqua et al. | 73/299 |
| 4,449,403 | 5/1984 | McQueen | 73/295 |

*Primary Examiner*—Steven L. Stephan
*Assistant Examiner*—David R. Schuster
*Attorney, Agent, or Firm*—Eric P. Schellin

[57] ABSTRACT

A liquid coolant measuring instrument for a nuclear reactor vessel measures the liquid coolant level by utilizing the thermal characteristics of the medium surrounding the instrument. The instrument has an elongated cylindrical body having a number of difference thermocouples disposed within at various levels. A sectional electrical resistance heating element is located within the elongated body. The heating element heats one junction of each difference thermocouple and by monitoring the increase in temperature signal at different levels within the vessel, the liquid level can be determined. The instrument is also provided with a shield tube that surrounds the instrument forming an annular space therebetween. Liquid coolant enters the tube through a bore having a baffle that strips entering liquid of entrained non-liquid bubbles such as steam and gasses, thereby providing measurement for the actual liquid coolant level and not the expanded coolant level.

9 Claims, 7 Drawing Figures

APPARATUS FOR AND METHOD OF DETERMINING THE LIQUID COOLANT LEVEL IN A NUCLEAR REACTOR

BACKGROUND OF THE INVENTION

1. Field of the Invention:

The present invention relates to an apparatus for and method of determining the liquid coolant level in a nuclear reactor.

2. Description of the Prior Art:

Monitoring of coolant within a nuclear reactor is vitally important to insure proper operation of the reactor. The nuclear reactor must be continually cooled by a liquid coolant to prevent such catastropic results, such as "melt down". The importance of coolant was dramatically illustrated by the recent "Three Mile Island" disaster. Presently, it is difficult to accurately measure a liquid coolant inventory within a nuclear reactor.

Using the thermal characteristics of a liquid to determine its level has been disclosed in U.S. Pat. Nos. 2,279,043, to Harrington, 2,702,476, to De Boisblanc, and 3,280,627, to Cousins et al. In these references a number of thermocouples are vertically distributed within a container and are used to sense the temperature at different levels in the container. An electrical heater element is located adjacent to the thermocouples, and provides a uniform source of heat along the entire line of thermocouples. Heat from the heat source transfers more readily into liquids so that the temperature at a thermocouple covered by liquid is less than the temperature at a thermocouple bathed only by gases and vapors. If the temperature signal at the higher thermocouples is significantly greater than the temperature signal at the lower thermocouples, the level of liquid in the container can be located where the sudden temperature increase first occurs.

In all of the disclosed liquid level thermal sensors the heater element provides a uniform heat along the entire length of the instrument. The heating element used in the present invention is a slender rod having sectional heating zones of high and low heat depending on the location of the thermocouples. Difference thermocouples are used rather than absolute thermocouples for faster response and less sensitivity to extraneous temperature noise. In addition a tube is disposed around the instrument to provide more accurate readings of the actual liquid level and not the expanded liquid level.

SUMMARY OF THE INVENTION

It is the aim of the present invention to provide a liquid level sensor that can be located and operated in a nuclear reactor vessel or any other type of liquid-container in which the level is important. A further aim is to provide a sensor as a rugged monolithic device. Another aim is to provide a sensor which is not sensitive to the bubbling in a hot or reactive liquid, but instead measures the level of the collapsed liquid. Another aim is to make the sensor insensitive to temperature transients, but have a short time constant for level changes.

The instrument comprises an elongated body in which are mounted a plurality of difference thermocouples which adjoin a heating means. The heating means is modified to form sectional heating zones or levels of high and low heat. The heated junctions of the thermocouples are disposed at intervals along the elongated body. Associated with each heated junction is an unheated junction. The unheated junctions are located in the low heat zones. Indicating means indicate the temperature difference at various levels. A signal profile for the reactor can be developed relating coolant heat transfer to reactor elevation. By heating one junction of each thermocouple by the sectional heating means the temperature difference between each heated junction and associated unheated junction within the instrument will indicate if it is surrounded by liquid coolant or gasses.

If liquid coolant is present at a heated junction, the temperature of the junction will be significantly lower than if it is surrounded by gasses, because heat transfers more quickly into liquids than into gasses. A signal profile indicating a sudden increase in temperature difference with vertical elevation will indicate the liquid coolant level.

In a nuclear reactor environment the liquid level may be difficult to determine because the liquid is expanded by entrained gas and steam bubbles. To measure the actual liquid level the entrained gasses and steam must be eliminated from the measurements. Therefore, a shield tube surrounds the elongated body of the instrument providing an annular space about the instrument into which liquid coolant can flow. The actual liquid level without gas or entrained steam or "void-collapsed level", is monitored in this space and the actual liquid coolant level and liquid coolant volume can be calculated. This configuration can be viewed as an "internal sight glass" because an external boiler sight glass gives similar collapsed level, or inventory, information. The inventory or weight of the liquid can be calculated from the collapsed level and the density of the liquid.

These and further constructional and operational characteristics of the invention will be more evident from the detailed description given hereinafter with reference to the figures of the accompanying drawing which illustrate a preferred embodiment and an alternate by way of non-limiting examples.

DESCRIPTION OF THE PREFERRED EMBODIMENT

Figure 1:
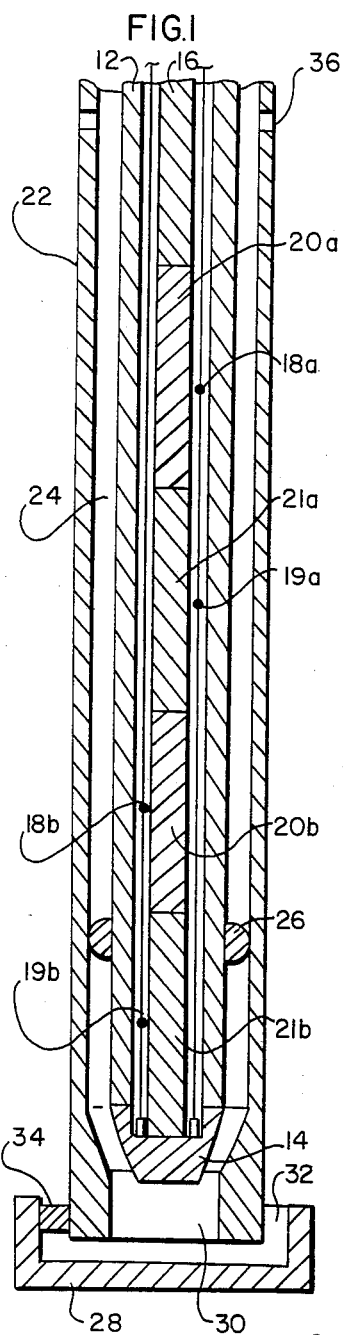
FIG. 1 is a cross-sectional view of the instrument and shield tube.

Referring now to the drawings wherein reference numerals are used to designate parts throughout the various figures thereof, there is shown in FIG. 1, the instrument 10 which comprises an elongated cylindrical tube 12 closed off at its base portion by thimble 14, thereby forming an elongated body. Electrical heating element 16 is disposed down the central axis of elongated cylindrical tube 12. A plurality of thermocouples are disposed around the circumference of the heating element 16, of which two are illustrated having heated junction 18a and 18b, and unheated junctions 19a and 19b. Junctions 18a and 18b are heated by heating element 16.

The heating element is formed into a very slender rod of electrically conductive and heat conductive materials. Specifically, sections 20a and 20b disposed opposite the heated junctions of the thermocouples are formed from high heating materials, such as Nichrome. Sections 21a and 21b of the heating element are formed of low heating materials, such as Copper. By applying electricity to the slender rod, zones adjacent to the Nichrome sections will be heated because of its high resistivity.

Instrument 10 is shrouded or shielded by shield tube means 22 which forms annular space 24 between the instrument and the shield tube means. Insulation spacer means 26 maintains this annular space by spacing the tube means a fixed distance from the instrument. The spacer also thermally isolates the shield tube from the instrument to prevent inaccurate temperature reading. Liquid passes freely through the annular space because spacer means 26 is relatively open to permit the upward and downward movement of liquid and vapors within the annular space.

Baffle means 28 acts to prevent the flow of gas and steam bubbles into the annular space through bore 30. More specifically, gas and steam bubbles will not flow down through annular entrance 32, formed by the baffle means, and the shield tube means, and in through bore 30. Baffle means 28 is secured to the shield tube at 34 by any suitable means. The shield tube is also provided with vent means 36 which allows entrapped air to escape when liquid coolant enters the annular space, and also to prevent a vacuum when liquid coolant exits the space.

Figure 2:
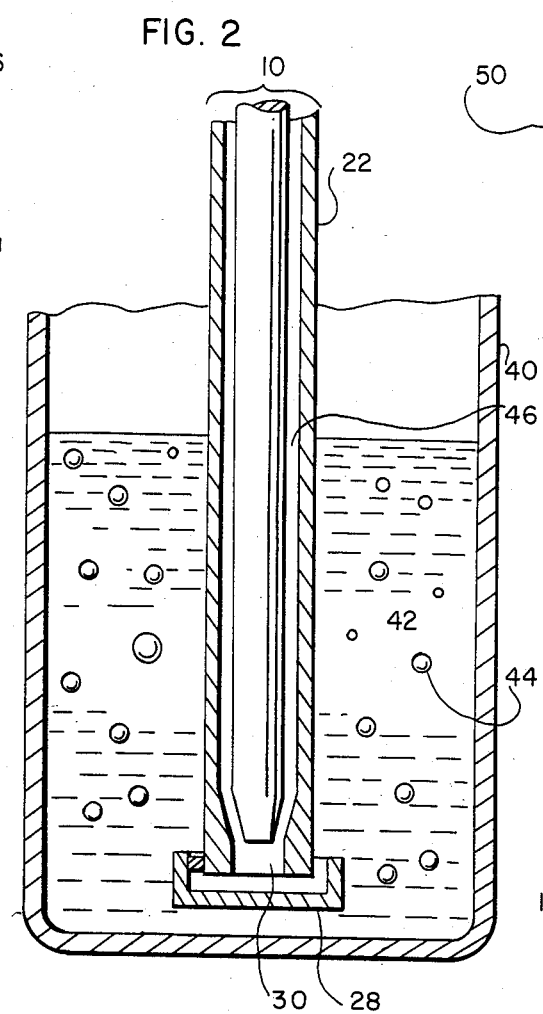
FIG. 2, is a partial cross-sectional view of the instrument disposed in a nuclear reactor vessel.

FIG. 2 illustrates the use of the instrument in a nuclear reactor vessel 40. Vessel 40 is provided with liquid coolant 42 which is in an expanded condition due to steam and gas bubbles 44. Liquid coolant entering annular space 24 through bore 30 is stripped of these bubbles by baffle means 28, as discussed above. Therefore, liquid coolant level 46 represents the collapsed liquid coolant level within the reactor vessel without gas and steam bubbles. Instrument 10 can then be used to determine the collapsed liquid coolant level and actual liquid coolant mass.

Figure 3:
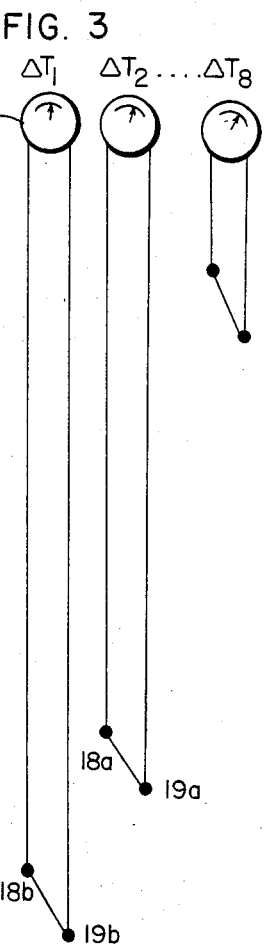
FIG. 3, is a schematic view of heated and non-heated junctions of the thermocouples.

FIG. 3 is a schematic of the thermocouples of the instrument. $T_1, T_2 \ldots T_8$ represent the eight difference thermocouples. As illustrated, the output of the thermocouples is indicated on indicator means 50 comprising a series of gauges, however any suitable indicating means for thermocuples will do. In addition to the temperature differential thermocouples there is an absolute thermocouple represented by $T_{ABS}$ which measures the unheated temperature of the liquid coolant in the reactor. Please note, that the invention is not dependent on the specific number of thermocouples and more or less than eight thermocouples can be used.

Figure 4:
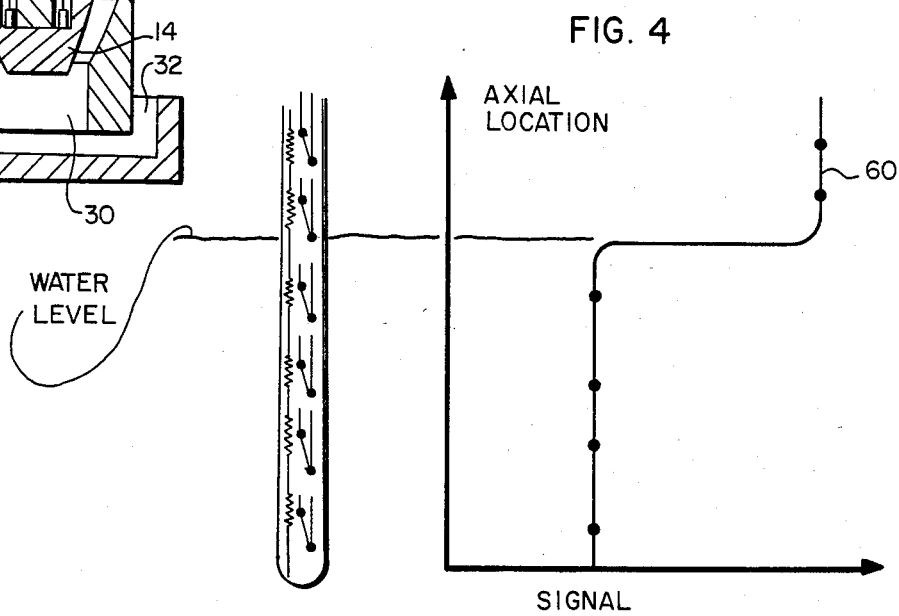
FIG. 4, is a schematic of the liquid coolant level versus temperature signal of the thermocouples.

The temperature measurement of the difference thermocouples can be used to develop temperature profile 60 of the temperature signal versus elevation in the vessel. As illustrated in FIG. 4, when a liquid coolant, such as water, is not present during heating of the heated junction of the thermocouple by the electrical heater means the temperature at the corresponding thermocouple junction is significantly higher than at the unheated thermocouple junction. Therefore by knowing the axial location of the thermocouple, the liquid coolant level of the reactor vessel can be determined.

Figure 5:
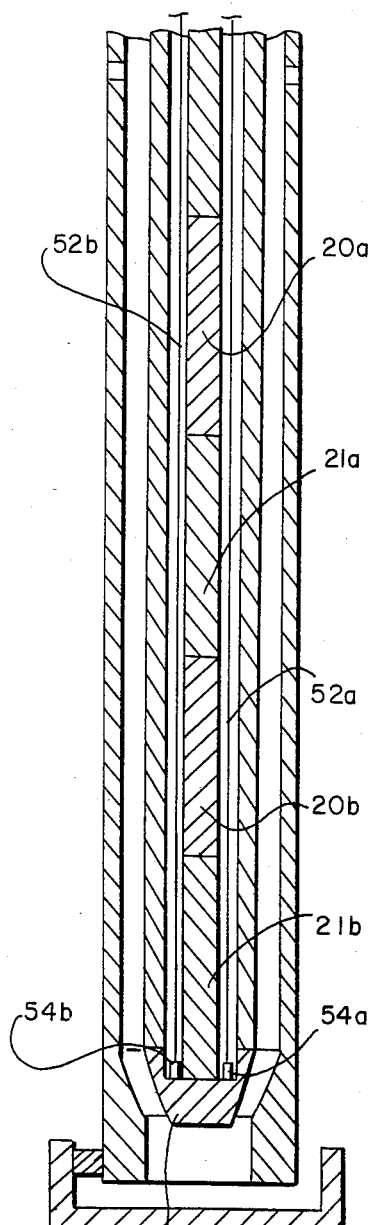
FIG. 5 is a cross-sectional view of an alternate embodiment of the instrument and shield tube.
Figure 6:
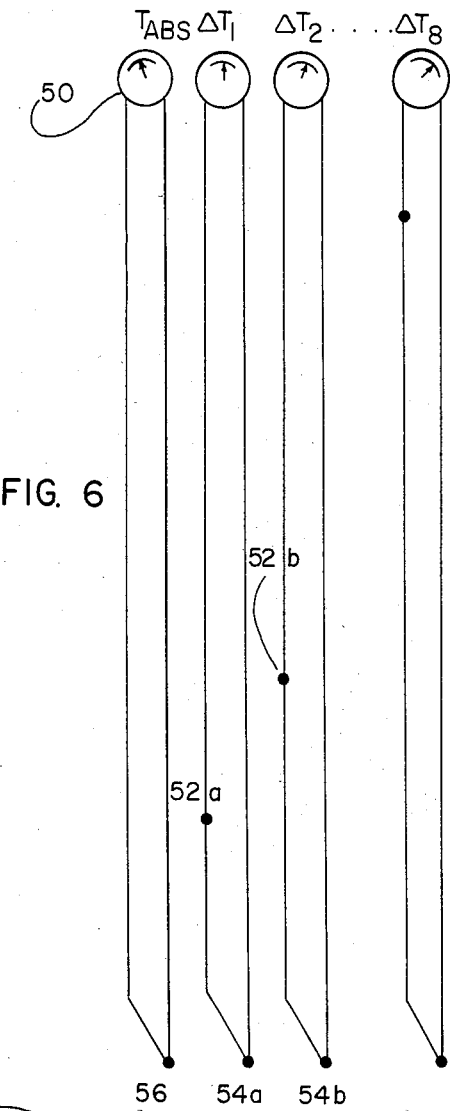
FIG. 6 is a schematic view of the junctions of the thermocouples in the alternate embodiment.
Figure 7:
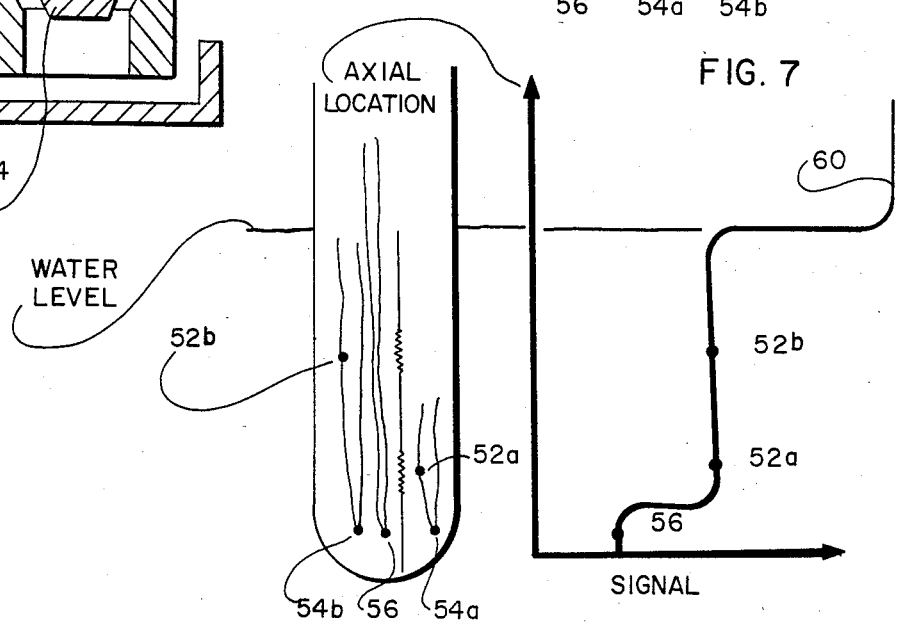
FIG. 7 is a schematic of the liquid coolant level versus temperature signal of the thermocouples for the alternate embodiment.

In an alternate embodiment shown in FIGS. 5, 6 and 7 the unheated junctions of each difference thermocouple can be located in a common unheated region in the thimble 14 at the bottom of the elongated tube 12. An absolute thermocouple 56 can be used to measure the temperature of the coolant. The information from the absolute temperature of the coolant can be combined with the difference signals to develop a signal profile on an absolute temperature scale as shown in FIG. 7. This alternate embodiment has the disadvantage that the time dynamics of the level signal is limited by the time dynamics of the coolant. For example, in a reactor as the reactor is suddenly turned off a signal is developed between the coolant temperature at the bottom and the heated difference junctions which is not due to level changes. This can lead to false readings. In addition the time response of the difference thermocouple is limited by the response of the slower junction which is located in the thimble.

In the preferred embodiment as shown in FIGS. 1–4, the closesness of the two junctions makes the time response of the difference thermocouple faster and less subject to contamination of signals by temperature transients in the coolant.

The present invention can also be used to determine the liquid level in other vessels besides nuclear reactors.

This invention is not limited to the preferred embodiment and alternate heretofore described, to which variations and improvements may be made, consisting of mechanically and electrically equivalent modifications to component parts, without leaving the scope of protection of the present patent, the characteristics of which are summarized in the following claims.

What is claimed is:

1. An instrument for measuring liquid level within a liquid containing vessel comprising:
    an elongated body having a longitudinal axis extends into a liquid containing vessel in a generally vertical direction;
    a plurality of difference thermocouples arranged within said elongated body, each said difference thermocouple comprising a heated and unheated junction; and
    electrical heating means formed of electrically conductive materials which comprise high and low heating materials located in alternate zones along the length of said elongate body, the electrical heating means comprising a single slender rod which extends down the length of the elongated body parallel to the longitudinal axis, whereby the heated junction of each said difference thermocouple is heated by one zone of high heating material located adjacent to the heated junction, and the unheated junction of each of said difference thermocouple is located adjacent to one zone of low heating material.

2. An instrument as in claim 1 where each unheated junction is located in the unheated bottom of said elongated body.

3. An instrument as in claim 1 where said high heating material is Nichrome and said low heating material is copper.

4. An instrument as in claim 1 additionally comprising a shield means shrouding said elongated body forming an annular space between said shield means and said elongated body, said annular space communicating with liquid in said vessels.

5. An instrument as in claim 4 wherein said shield means comprises a tube means having a bore which communicates with said annular space at the bottom.

6. An instrument as in claim 5 additionally comprising a baffle means that is mounted at said bore whereby the liquid is stripped of entrained bubbles.

7. An instrument as in claim 6 additionally comprising a vent near the top of said tube means communicating liquid between said annular space and the outside of said tube means.

8. An instrument as in claim 7 further comprising an insulation space that maintains said shield means at a fixed distance from said elongated body; said spacer means also thermally isolates said elongated body from said shield means.

9. A method for determining the liquid level within a nuclear reactor vessel using the instrument of claims 1, 2, 3, 4, 5, 6, 7 or 8.

* * * * *

REEXAMINATION CERTIFICATE (1370th)
United States Patent [19]
Waring et al.

[11] B1 4,592,230
[45] Certificate Issued  Oct. 16, 1990

[54] APPARATUS FOR AND METHOD OF DETERMINING THE LIQUID COOLANT LEVEL IN A NUCLEAR REACTOR

[75] Inventors: James P. Waring, Rockville; Robert D. Smith, Bethesda, both of Md.

[73] Assignee: Scandpower Inc., Bethseda, Md.

Reexamination Request:
No. 90/001,372, Nov. 6, 1987

Reexamination Certificate for:
Patent No.: 4,592,230
Issued: Jun. 3, 1986
Appl. No.: 514,600
Filed: Jul. 18, 1983

[51] Int. Cl.$^5$ ............................................. G01F 23/00
[52] U.S. Cl. ..................................... 73/295; 73/290 R
[58] Field of Search ............... 73/290 R, 295; 374/141, 374/142; 219/544; 376/245, 247, 254, 258; 137/140, 247.33, 247.35

[56]  References Cited
U.S. PATENT DOCUMENTS

| | | | |
|---|---|---|---|
| 695,311 | 3/1902 | Hickey | 137/247.35 |
| 1,478,845 | 12/1923 | Berry | 338/333 |
| 1,748,822 | 2/1930 | Arsem | 428/635 |
| 1,983,862 | 12/1934 | Maness et al. | 428/457 |
| 2,702,476 | 2/1955 | De Boisblanc | 73/295 |
| 3,280,627 | 10/1966 | Cousins et al. | 73/295 |
| 3,348,186 | 10/1967 | Rosen | 338/214 |
| 3,646,322 | 2/1972 | Speekman | 338/214 |
| 3,898,431 | 8/1975 | House et al. | 219/534 |
| 3,898,638 | 8/1975 | Deane et al. | 340/243 |
| 3,964,311 | 6/1976 | Holmen | 73/295 |
| 4,298,430 | 11/1981 | Rolstad et al. | 376/247 |
| 4,356,061 | 10/1982 | Smith et al. | 376/254 |
| 4,361,038 | 11/1982 | Schuler | 73/295 |
| 4,411,859 | 10/1983 | Smith et al. | 376/247 |
| 4,418,035 | 11/1983 | Smith | 376/247 |
| 4,425,297 | 1/1984 | Rolstad et al. | 376/247 |
| 4,439,396 | 3/1984 | Rolstad | 376/247 |
| 4,440,716 | 4/1984 | Smith | 376/247 |
| 4,440,717 | 4/1984 | Bevilacqua et al. | 73/299 |
| 4,449,403 | 5/1984 | McQueen | 73/295 |
| 4,459,045 | 7/1984 | Smith | 374/132 |

OTHER PUBLICATIONS

J. E. Hardy et al, Advanced Two-Phase Flow Instrumentation Program, NUREG/CR-2204, pp. 2, 3, 8, 9, 10, 13 (Jul./81).

K. G. Turnage et al, Advanced Two-Phase Flow Instrumentation Program, NUREG/CR-2007 (Approx. Apr./81).

R. W. McCulloch, Proceedings of the International Symposium on Fuel Rod Simulators, pp. 22, 23, 39, 132, 540, 541, 542, 576, 577, 610, 611, 664, 665 Conf-801091 (May 81).

Primary Examiner—William A. Cuchlinski, Jr.

[57]  ABSTRACT

A liquid coolant measuring instrument for a nuclear reactor vessel measures the liquid coolant level by utilizing the thermal characteristics of the medium surrounding the instrument. The instrument has an elongated cylindrical body having a number of difference thermocouples disposed within at various levels. A sectional electrical resistance heating element is located within the elongated body. The heating element heats one junction of each difference thermocouple and by monitoring the increase in temperature signal at different levels within the vessel, the liquid level can be determined. The instrument is also provided with a shield tube that surrounds the instrument forming an annular space therebetween. Liquid coolant enters the tube through a bore having a baffle that strips entering liquid of entrained non-liquid bubbles such as steam and gasses, thereby providing measurement for the actual liquid coolant level and not the expanded coolant level.

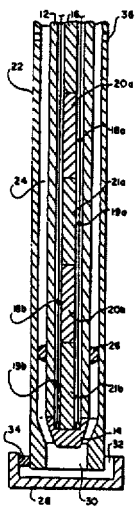

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 3, 4, 5, 6, 7, 8 and 9 are determined to be patentable as amended.

New claims 10, 11, 12 and 13 are added and determined to be patentable.

1. An instrument for measuring liquid level within a liquid containing vessel comprising:
    an elongated body having a longitudinal axis [extends] *extending* into [a] *at least a portion containing a liquid coolant inventory in the liquid containing vessel and into at least a portion containing gaseous or vaporous inventory in the* liquid containing vessel *and the elongated body being so disposed to extend* in a generally vertical direction;
    *a plurality of difference thermocouples arranged within said elongated body,*
    each said difference thermocouple comprising a heated and unheated junction; and]
    *electrical heating means extending coaxially down the longitudinal axis of the elongated body,*
    *the* electrical heating means formed of electrically conductive materials which comprise high *heating* material and low heating [materials] *material* serially disposed *and* located in alternate zones along the length of said [elongate] *elongated* body, *and forming a portion of an electrical current path of the electrical heating means,* the electrical heating means comprising a single slender rod which extends down [the longitudinal axis of the length of the elongated body parallel to the longitudinal axis,
    *a plurality of difference thermocouples arranged peripherally of the electrical heating means within said elongated body,*
    *each said difference thermocouple comprising a heated junction and an unheated junction,* whereby
    the heated junction of each said difference thermocouple is *located adjacent to and is* heated by [one] *the adjacent* zone of high heating material [located adjacent to the heated junction], and *whereby*
    the unheated junction of each [of] said difference thermocouple is located adjacent to [one] *and is essentially and relatively unheated by the adjacent* zone of low heating material,
    *means including a shield having an upper extremity and a lower extremity and the shield means forming an annular space between the shield means and the elongated body for receiving liquid coolant inventory, and*
    *means at the lower extremity having a space within which liquid coolant inventory remains and forms a seal for preventing the passage or escapement of gaseous or vaporous inventory through the space of the seal means.*

2. An instrument as in claim 1 where each unheated junction is located in [the] *an* unheated bottom of said elongate body.

3. An instrument as in claim 1 where said high heating material is [Nichrome] *NICHROME* and said low heating material is copper.

4. An instrument as in claim 1 additionally comprising
    [a] *the* shield means *is cylindrically configured for* shrouding said elongated body forming [an] *the* annular space between said shield means and said elongated body, *and*
    said annular space [communicating] *communicates* with *the* liquid *coolant inventory* in said [vessels] *vessel.*

5. An instrument as in claim 4, wherein said shield means comprises
    a tube means having a bore which communicates with *a bottom of* said annular space [at the bottom].

6. An instrument as in claim 5 additionally comprising
    *the seal means that includes* a baffle means that is mounted at said bore whereby the liquid *coolant inventory* is stripped of entrained bubbles.

7. An instrument as in claim 6 additionally comprising
    a vent near [the] *a* top of said tube means communicating *the* liquid *coolant inventory* between said annular space and [the] *an* outside of said tube means.

8. An instrument as in claim 7 further comprising
    an insulation [space] *spacer means* that maintains said shield means at a fixed distance from said elongated body; *and*
    said *spacer means also thermally isolates* said elongated body from said shield means.

9. A method for determining the liquid level within a nuclear reactor vessel using the instrument of [claims] *claim* 1,2,3,4,5,6,7 or 8.

*10. The instrument as in claim 1 wherein*
    *the single slender rod of the electrical heating means is disposed generally coaxially within the elongated body.*

*11. The instrument as in claim 1 further comprising*
    *means for receiving a temperature signal of each said difference thermocouple of the plurality and for indicating that presence of heat from the electrical heating means transfers more readily into the liquid coolant inventory than into the gaseous or vaporous inventory and the temperature at one of said difference thermocouples covered by the liquid coolant inventory is less than the temperature at one of said difference thermocouples bathed only by gaseous or vaporous inventory, so that when the temperature signal at a higher located said difference thermocouple is significantly greater than a temperature signal at a lower located said difference thermocouple, the level of the liquid coolant inventory in the liquid vessel can be relatively determined and located where sudden temperature change occurs.*

*12. The instrument as in claim 1 wherein*
    *the seal means is formed by a baffle means including an annular entrance disposed for downward entrance only of the liquid coolant inventory and thence into the annular space, and thereby generally precluding entry and flow of the gaseous or vaporous inventory therethrough.*

13. The method for determining the liquid level within a nuclear reactor vessel using the method of claim 9 and wherein included is the step of indicating temperature signals of at least one difference thermocouple of the plurality covered by the liquid coolant inventory and of at least another difference thermocouple not covered or bathed by liquid coolant inventory and for display of any sudden temperature change.

* * * * *